United States Patent [19]

Hoffman

[11] Patent Number: 5,266,107
[45] Date of Patent: Nov. 30, 1993

[54] PEARLSCENT PIGMENT AND PROCESS FOR PRODUCING THE SAME

[75] Inventor: Paul R. Hoffman, Savannah, Ga.

[73] Assignee: Merck Patent Gesellschaft mit Beschrankter Haftung, Darmstadt, Fed. Rep. of Germany

[21] Appl. No.: 993,737

[22] Filed: Dec. 21, 1992

[51] Int. Cl.$^5$ ............................ C09C 3/06; C09C 1/02
[52] U.S. Cl. .................................... 106/415; 106/417; 106/418; 106/446
[58] Field of Search ............... 106/417, 446, 415, 418

[56] References Cited

U.S. PATENT DOCUMENTS 3,087,828  4/1963  Linton .................................. 106/446
4,494,993  1/1985  Bernhard et al. .................... 106/417

FOREIGN PATENT DOCUMENTS 256417  8/1987  European Pat. Off. .
268918  11/1987  European Pat. Off. .
342533  5/1989  European Pat. Off. .
393579  4/1990  European Pat. Off. .

Primary Examiner—Mark L. Bell
Assistant Examiner—Scott L. Hertzog
Attorney, Agent, or Firm—Millen, White, Zelano & Branigan

[57] ABSTRACT

A pearlescent pigment comprising a platelet-shaped substrate coated with titanium dioxide, an oxide of copper, and optionally oxides of aluminum, and/or zinc, whereby the pigment is silver-gray.

10 Claims, No Drawings

PEARLSCENT PIGMENT AND PROCESS FOR PRODUCING THE SAME

BACKGROUND OF THE INVENTION

The present invention relates to pearlescent pigments having silver-gray gloss and excellent brightness. The pigments are based on a platelet-like, i.e., platelet-shaped, substrate coated with titanium dioxide and additionally oxidic compounds of copper, aluminum, and/or zinc. The invention also relates to a process for producing the same.

Metal flakes are used as pigments in paint for outdoor use, especially for exterior coating of cars. Aluminum flakes, for example, are used as pigment to obtain a silver-gray color. However, metals, especially aluminum, are disadvantageous in aqueous lacquer because they are reactive in aqueous systems. Specifically, contact of these metals with water generates dangerous quantities of hydrogen. It is known that paints of this type also undergo changes in appearance when exposed to various weather conditions. Therefore, it is difficult to obtain coatings with reproducible attributes.

In order to avoid these disadvantages, the metal flakes can be coated with polymers as disclosed in EP-A-0 393 579 (corresponding to U.S. Pat. No. 5,039,343). However, if metal pigments are mixed with pigments having mica flakes as a substrate for water-based varnish, the coating can be destroyed by the sharp edges of the mica flakes, and hydrogen may be generated. Therefore, there exists a need for the replacement in these and other uses of conventional metallic pigments.

SUMMARY OF THE INVENTION

Accordingly, it is an object of the present invention to provide a silver-gray pearlescent pigment as a replacement for aluminum flakes in special formulations.

Upon further study of the specification and appended claims, further objects and advantages of this invention will become apparent to those skilled in the art.

These objects are solved according to the present invention by providing a pearlescent pigment comprising a platelet-shaped substrate with titanium dioxide and an oxidic compound of copper, and optionally oxidic aluminum and/or zinc.

The use of the above-mentioned oxides for the coating of mica flakes is known. Zinc oxide is used in colored thin filler pigments to achieve a unique color tone as described in EP-A-0 256 417 (corresponding to U.S. Pat. No. 4,956,019). Furthermore, it is known from EP-B-082 985 (corresponding to U.S. Pat. No. 4,494,993) to increase the transparency and color intensity of a $TiO_2$ pearlescent pigment by co-precipitation of $Al_2O_3$ and $SiO_2$ onto the base pigment. However, these pigments do not have such a silver-gray gloss as achieved with the pigments according to the present invention.

The amount of titanium dioxide on the silver-gray pigment according to the present invention varies from 10–50%, preferably 20–40%, more preferably from 25–35% by weight, relative to the total pigment weight, and varies dependent inversely on the particle size of the substrate. The amount of Cu oxide (CuO) needed to produce silver gray must be larger than 0.7%, e.g., 1.5% as $CuCl_2.2H_2O$ by weight relative to the total substrate weight. Preferably, the amount of CuO in the finished pigment is 0.7–25%, more preferably 0.7–7% by weight.

The molar ratios of the components in the finished pigments are preferably in the following ranges:
Cu:Al>1
Cu:Zn>1
Cu:Al>$\frac{1}{2}$ if Zn is present
Cu:Zn>4/3 if Al is present
Al:Cu<1
Zn:Cu<1
Al:Cu<2 if Zn is present
Zn:Cu<$\frac{2}{3}$ if Al is present
All of the above combinations result in a silver-gray product.

All water-soluble salts of titanium, copper, aluminum and zinc capable of forming hydrated oxide by hydrolysis can be used. Chlorides are preferred.

Platelet-shaped substrates may include clays, such as kaolin, talc, sericite, mica or pyrophyllite, as well as synthetic mica, and metal oxides such as iron oxide or aluminum. In the invention, the substrate preferably has a diameter of from 1–200 μm, preferably from 9–49 μm and a thickness of from 0.1–10 μm, preferably from 0.5–1.5 μm. Preferred platelet-shaped substrates include mica flakes.

Furthermore, the invention involves a process for preparing pearlescent pigments comprising a platelet-shaped substrate, e.g., mica flakes, coated with titanium dioxide and oxidic compounds of copper, aluminum and/or zinc by suspending platelet-like substrates in an aqueous solution of a pH from 1 to 4, preferably 2 to 3 adjusted with dilute acid, at a temperature in the range of from 40°–90° C., preferably 60°–80° C.; adding a solution of water-soluble salts of metals, e.g., titanium, copper, aluminum and zinc thereto and maintaining the solution pH substantially constant; precipitating the hydrated metal oxides on the surface of said substrate; raising the pH to within the range of from 6 to 9 and preferably to 7 to 8 by means of a suitable base to complete the precipitation of the hydrolysed metal salts still in solution; and then filtering, washing, drying the pigment at 100°–130° C., preferably at 105° C.–120° C., and calcining it at 600° C.–1000° C., preferably 750°–800° C. Copper, aluminum and/or zinc salts need not be added as solutions and need not be added simultaneously with the $TiCl_4$. These salts may be added as powders during and/or subsequent to addition of the $TiCl_4$, with the pH then being raised to effect precipitation. Solid addition is preferred in a large-scale plant process, as clean-up between batches may be minimized. The normal pigment coating process is heterogenous. Solid mica is agitated as a slurry in deionized water. The "$TiCl_4$" solution and the base (caustic soda or sodium carbonate) solution are added to the slurry at different positions in the reactor. The active chemicals begin reaction upon contact with the slurry and continue while dispersing. Consequently no one sample of the reaction is identical to any other at a given time thereby defining an heterogeneous reaction process. The procedure also works in a homogeneous environment.

In preparing the pigments, the substrate is suspended in deionized water in a concentration of from 3–20%, preferably from 6–12% by weight while stirring. The pH is adjusted to within the range of from 1 to 4, preferably 2 to 3, by means of a suitable acid, e.g., dilute hydrochloric acid. Then the slurry is heated to a temperature in the range of from 40°–90° C., preferably 60°–80° C., and a solution of water-soluble salts of titanium, copper, aluminum and zinc is added, as discussed above, i.e., the salts of the four metals are simultaneously or one after another metered as aqueous solution into the substrate slurry under usual conditions.

During the addition of the salt solution the pH is maintained between 1 and 4, preferably 2 and 3, by the simultaneous addition of a suitable base, e.g., dilute sodium hydroxide and/or sodium carbonate solution. Upon completion, the mixture is stirred for some minutes.

The pH is then raised to within the range of from 6 to 10 and preferably to 7 to 8 by means of a suitable base over a period of from 60 to 120, preferably 80 to 100 minutes. Then the slurry is filtered and washed with deionized water. The product is dried overnight at 100° to 130° C., preferably 105°-120° C., and calcined at 600°-1000° C., preferably 750°-800° C. for 20 to 60 minutes, preferably 30 to 40 minutes. The calcination temperature is preferably higher than 600° C., temperatures above 1000° C. will damage the mica and affect the pigment negatively.

The color producing compounds as solids or solutions can be added either during the coating with titanium tetrachloride or after the coating has reached the desired color endpoint.

It is interesting to note that the addition of a copper compound enhances the formation of the rutile structure in the $TiO_2$ coating.

The pigment according to the present invention shows silver-gray gloss and excellent brightness. The pigment is suitable to partially replace metal flakes, particularly, aluminum flakes. The pigment shows weatherability sufficiently high to be employed as a colorant of paint for outdoor use, particularly exterior paint for cars, and its dispersibility remains high, with no adverse effect at all upon the color tone and gloss of the base pigment. The pigment may have an additional coating of hydrated zirconium oxide as in EP-B-0,268,918 (corresponding to U.S. Pat. No. 4,828,623) or EP-A-0,342,533, to enhance weatherability.

The pearlescent pigment according to the invention can be used not only in paint for outdoor use, but also in many other outdoor materials such as plastics. Furthermore, the pigment can be used for pigmentation of engobes, glazes, enamels and ceramic materials.

The hiding power of the new pigment is higher than conventional pigments, e.g., silver-white pigments manufactured by E. Merck, Darmstadt.

These properties in connection with the silver-gray appearance that is capable of mimicking the appearance of aluminum flakes is an advantage of the new pigments that no other product has been able to achieve at this point in time.

Without further elaboration, it is believed that one skilled in the art can, using the preceding description, utilize the present invention to its fullest extent. The following preferred specific embodiments are, therefore, to be construed as merely illustrative and not limitative of the remainder of the disclosure in any way whatsoever.

In the foregoing and in the following examples, all temperatures are set forth uncorrected in degrees Celsius; and, unless otherwise indicated, all parts and percentages are by weight.

The entire disclosure of all applications, patents, and publications, cited above and below, are hereby incorporated by reference.

EXAMPLES

Example 1

100 g of 9–49 μm uncalcined mica is placed in a 4 l beaker equipped with two baffles. Deionized water is added to 1500 ml total volume. The suspension is stirred at 250 rpm (80 mm dia blade) and heated to 75° C. The pH is adjusted to 2.2 with 10% w/w HCl (pH confirmed with Paul Frank pH Paper No. 1832). A solution containing 255.46 g filtered $TiCl_4$ solution (d=1.2193 g/cc) to which has been added 2.14 g $CuCl_2.2\ H_2O$ and 1.51 g $AlCl_3.6\ H_2O$ is metered into the suspension (molar ratios of Ti:Cu:Al of 56.05:2:1). The pump speeds are set for 15 ml/hr for 5 min, 22 ml/hr for 5 min, 30 ml/hr for 15 min, 45 ml/hr for 15 min, then 60 ml/hr to completion. A 20% NaOH solution is used to keep pH between 2.13 and 2.27. Addition tubes for both acid and base are set so that the inflow takes place above the surface of the slurry and on opposite sides of the beaker. Upon completion, the suspension is stirred for 15 min (still maintaining temperature at 75° C.), then 1.00 g $Na_2SO_4$ (anhyd.) solid is added all at once. At this point the product is white, and the solution is light blue. The suspension is stirred 15 min, then a 20% $Na_2CO_3$ solution is added dropwise to attain a pH of 8.0 (confirmed by Lyphan pH Papers L671-8). Approximately 60 min is required for this addition. At this point the product should be a pastel "green-blue", and the solution should be colorless. The suspension is stirred 15 min then is isolated by filtration and is washed on the filter with deionized water (approx. 2500 ml). The product is broken up into small pieces, is dried overnight at 100° C., then is calcined in several crucibles at 775° C. for 30 min. After cooling, the product is a lustrous light silver-gray with a silver to silver-blue interference color.

Example 2

Mass-tone panels pigmented with 7% pigment (only pearlescent pigments) have the following film thickness to hiding:

| | |
|---|---|
| Iriodin ® 103 (E. Merck): | >277 μm |
| pigment according to the present invention: | 95 to 120 μm |

Panels sprayed with Cronar 1850 J system (blue master batch) with pigment concentration of 1 g mica pigment: 10 g 1850 H had the following film thickness to hiding:

| | |
|---|---|
| Iriodin ® 9103 | 88 to 91 μm |
| Iriodin ® 9111 | 72 to 75 μm* |
| Iriodin ® 9121 | 72 to 76 μm* |
| pigment according to the present invention: | 36 to 39 μm |

*smaller particle size

A comparison of the new product with the products with smaller particle sizes clearly shows that the new product enables production of film thicknesses having desirable characteristics that were impossible to reach with conventional pigments.

Example 3

Absolute values of color for four samples in accordance with the invention (two light and two darker) based on CIE Lab scale are:

|  | L | a | b |
|---|---|---|---|
| *45° Over Black* | | | |
| Example | 39.92 | −0.62 | −0.92 |
| A | 40.72 | −0.54 | −0.88 |
| B | 38.88 | −0.35 | −1.43 |
| C | 38.52 | −0.30 | −1.05 |
| *22.5° Over Black* | | | |
| Example | 84.43 | −2.75 | −0.46 |
| A | 85.53 | −2.82 | −0.20 |
| B | 81.29 | −2.53 | −1.84 |
| C | 76.81 | −2.58 | −1.08 |
| *45° Over White* | | | |
| Example | 64.96 | 0.73 | 7.29 |
| A | 64.57 | 1.23 | 7.30 |
| B | 57.01 | 1.29 | 5.75 |
| C | 52.92 | 1.33 | 3.97 |

The preceding examples can be repeated with similar success by substituting the generically or specifically described reactants and/or operating conditions of this invention for those used in the preceding examples.

From the foregoing description, one skilled in the art can easily ascertain the essential characteristics of this invention and, without departing from the spirit and scope thereof, can make various changes and modifications of the invention to adapt it to various usages and conditions.

What is claimed is:

1. A pearlescent pigment comprising a platelet-shaped substrate coated with titanium dioxide, an oxide of copper, and optionally oxides of aluminum, and/or zinc, whereby the pigment is silver-gray.

2. A pigment according to claim 1, wherein titanium, copper and at least one of aluminum or zinc oxides are present.

3. A pigment according to claim 1, wherein titanium, copper and aluminum oxides are present.

4. A pigment according to claim 1, wherein titanium, copper and zinc oxides are present.

5. A pigment according to claim 1, wherein titanium, copper, zinc and aluminum oxides are present.

6. A pigment according to claim 1, wherein the molar ratios of copper to aluminum and/or zinc are:

Cu:Al>1,
Cu:Zn>1,
Cu:Al>½ if Zn is present, and
Cu:Zn>4:3 if Al is present, and the amount of copper oxide is at least 0.7% by weight relative to the total substrate weight.

7. A pigment according to claim 1, wherein the amount of copper oxide is 0.7–25% by weight.

8. A pigment according to claim 2, wherein the amount of copper oxide is 0.7–7% by weight.

9. In a paint, plastic, engobe, glaze, enamel, or ceramic material comprising a silver-gray pigment, the improvement wherein the pigment is one of claim 1.

10. In a paint, plastic, engobe, glaze, enamel, or ceramic material comprising a silver-gray pigment, the improvement wherein the pigment is one of claim 2.

* * * * *

UNITED STATES PATENT AND TRADEMARK OFFICE
CERTIFICATE OF CORRECTION

PATENT NO. : 5,266,107

DATED : Nov. 30, 1993

INVENTOR(S) : Paul R. HOFFMAN

It is certified that error appears in the above-identified patent and that said Letters Patent is hereby corrected as shown below:

Title page, ITEM (54)  The Title, and col. 1, line 2,

Change " PEARLSCENT "   to read - - PEARLESCENT - -

Signed and Sealed this

Twenty-sixth Day of April, 1994

Attest:

BRUCE LEHMAN

Attesting Officer

Commissioner of Patents and Trademarks